(12) United States Patent
Sasaki

(10) Patent No.: US 9,766,452 B2
(45) Date of Patent: Sep. 19, 2017

(54) VEHICLE HEADUP DISPLAY DEVICE

(71) Applicant: DENSO CORPORATION, Kariya, Aichi-pref. (JP)

(72) Inventor: Tatsuya Sasaki, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 21 days.

(21) Appl. No.: 14/916,194

(22) PCT Filed: Sep. 2, 2014

(86) PCT No.: PCT/JP2014/004483
§ 371 (c)(1),
(2) Date: Mar. 3, 2016

(87) PCT Pub. No.: WO2015/033549
PCT Pub. Date: Mar. 12, 2015

(65) Prior Publication Data
US 2016/0202472 A1    Jul. 14, 2016

(30) Foreign Application Priority Data

Sep. 5, 2013 (JP) .................................. 2013-184399

(51) Int. Cl.
*G02B 27/01* (2006.01)
*B60R 1/00* (2006.01)
(Continued)

(52) U.S. Cl.
CPC .............. *G02B 27/01* (2013.01); *B60K 35/00* (2013.01); *B60R 1/00* (2013.01); *G02B 26/0816* (2013.01);
(Continued)

(58) Field of Classification Search
CPC .... B60K 35/00; G02B 27/01; G02B 27/0149; G02B 2027/0154; G02B 2027/0163
See application file for complete search history.

(56) References Cited

U.S. PATENT DOCUMENTS

| 5,844,394 A | 12/1998 | Mushika et al. |
| 2005/0162340 A1 | 7/2005 | Nagano et al. |

(Continued)

FOREIGN PATENT DOCUMENTS

| JP | H10150798 A | 6/1998 |
| JP | 2003335148 A | 11/2003 |

(Continued)

OTHER PUBLICATIONS

International Search Report and Written Opinion (in Japanese with English Translation) for PCT/JP2014/004483, mailed Nov. 4, 2014; ISA/JP.

*Primary Examiner* — Sultan Chowdhury
*Assistant Examiner* — Magda Cruz
(74) *Attorney, Agent, or Firm* — Harness, Dickey & Pierce, P.L.C.

(57) ABSTRACT

A vehicle head-up display device includes a stepping motor that outputs a rotation to adjust an optical position of a reflecting mirror, a zero detection unit that detects a zero position by the rotation of the stepping motor in a return-to-zero direction, an initial adjustment unit that adjusts the optical position to an initial position based on the zero position by the rotation of the stepping motor in an away-from-zero direction, and a user adjustment unit that, after the adjustment of the initial position, adjusts the optical position to a command position based on the zero position responsive to a command from the vehicle user. The zero detection unit (Continued)

sets a higher rotation speed of the stepping motor than the user adjustment unit, and sets a lower output torque than the user adjustment unit.

6 Claims, 11 Drawing Sheets

(51) Int. Cl.
    *G02B 26/08*     (2006.01)
    *H02P 8/22*     (2006.01)
    *B60K 35/00*     (2006.01)

(52) U.S. Cl.
    CPC ..... *G02B 27/0101* (2013.01); *G02B 27/0149* (2013.01); *H02P 8/22* (2013.01); *B60R 2300/205* (2013.01); *G02B 2027/0145* (2013.01); *G02B 2027/0154* (2013.01); *G02B 2027/0159* (2013.01); *G02B 2027/0163* (2013.01)

(56) References Cited

U.S. PATENT DOCUMENTS

| | | | |
|---|---|---|---|
| 2005/0259301 A1* | 11/2005 | Aoki | G02B 27/0149 359/13 |
| 2008/0212196 A1* | 9/2008 | Watanabe | G02B 27/01 359/632 |
| 2011/0134498 A1 | 6/2011 | Ohta et al. | |
| 2011/0242666 A1 | 10/2011 | Sasaki et al. | |
| 2011/0242669 A1* | 10/2011 | Torii | G02B 27/0149 359/633 |
| 2013/0201541 A1 | 8/2013 | Sasaki et al. | |

FOREIGN PATENT DOCUMENTS

| | | |
|---|---|---|
| JP | 2004328836 A | 11/2004 |
| JP | 2010230157 A | 10/2010 |
| JP | 2010246207 A | 10/2010 |
| JP | 2011123126 A | 6/2011 |
| JP | 2011209617 A | 10/2011 |
| JP | 2013160905 A | 8/2013 |

\* cited by examiner

VEHICLE HEADUP DISPLAY DEVICE

CROSS REFERENCE TO RELATED APPLICATIONS

This application is a U.S. National Phase Application under 35 U.S.C. 371 of International Application No. PCT/JP2014/004483 filed on Sep. 2, 2014 and published in Japanese as WO 2015/033549 A1 on Mar. 12, 2015. This application is based on and claims the benefit of priority from Japanese Patent Application No. 2013-184399 filed on Sep. 5, 2013. The entire disclosures of all of the above applications are incorporated herein by reference.

TECHNICAL FIELD

The present disclosure relates to a vehicle head-up display device (hereinafter referred to as the "vehicle HUD device").

BACKGROUND ART

There is conventionally known a vehicle HUD device that displays a display light image, which is projected from a projector and reflected from a reflecting mirror, as a virtual image. When the reflecting mirror is used in this manner, the installation space required for the HUD device mounted in a vehicle can be reduced.

A vehicle HUD device disclosed in Patent Literature 1 is configured so that the rotation of a steeping motor is outputted in order to adjust the optical position of a reflecting mirror, and that the outputted rotation speed is reduced by a speed reducer gear mechanism and then transmitted to the reflecting mirror. More specifically, in the vehicle HUD device described in Patent Literature 1, a display range for enabling a user of the vehicle to view the virtual image and a reset range for inhibiting the vehicle user from viewing the virtual image are set as the mutually continuous ranges within which the stepping motor adjusts the optical position of the reflecting mirror. Within the reset range, a stopper mechanism disposed in the speed reducer mechanism stops the rotation of the reflecting mirror at an end opposite the display range.

Meanwhile, there is a concern in a typical vehicle HUD device that a rotary element may be displaced by vehicle vibration or other disturbance in a rotation transmission path between the stepping motor and the reflecting mirror.

In view of the above circumstances, the inventor of the present disclosure has conducted intensive studies to enable a stepping motor in a vehicle HUD device described, for instance, in Patent Literature 1 to output a rotation in a return-to-zero direction for the purpose of detecting a zero position at an end of the reset range that is opposite the display range. When the zero position is detected in the above manner, the optical position of the reflecting mirror can be accurately adjusted to an initial position based on the zero position within the display range by, after the detection of the zero position, causing the stepping motor to output a rotation oriented in an away-from-zero direction, which is a direction opposite the return-to-zero direction. Further, after the adjustment of the initial position, the optical position of the reflecting mirror can be accurately adjusted to a command position based on the zero position within the display range by causing the stepping motor to output a rotation responsive to a command from the vehicle user.

However, in order to detect the zero position and adjust the initial position, it is necessary to change the direction of rotation within the reset range and then change the optical position of the reflecting mirror into the display range. Therefore, a period of time required to determine the initial position is long. Consequently, an uncomfortable feeling may be given to the vehicle user. Further, the zero position is detected while the optical position of the reflecting mirror is held by the stopper mechanism. Therefore, when the stepping motor steps out, gears in the speed reducer mechanism may become rough to emit an obnoxious sound, giving an uncomfortable feeling to the vehicle user.

PRIOR ART LITERATURES

Patent Literature

Patent Literature 1: JP 2011-209617A

SUMMARY OF INVENTION

The present disclosure is made in view of the above circumstances. An object of the present disclosure is to increase comfort during the use of a vehicle HUD device.

A vehicle head-up display device according to an example of the present disclosure comprises: a projector that projects a display light image; an optical system that includes a rotatable reflecting mirror to reflect the display image light projected from the projector, and displays as a virtual image the display light image reflected from the reflecting mirror; a stepping motor that outputs a rotation to adjust an optical position of the reflecting mirror; a speed reducer gear mechanism that includes a plurality of gears to reduce a speed of the rotation, which is outputted from the stepping motor and transmitted to the reflecting mirror; and a control system that controls the rotation of the stepping motor. The vehicle head-up display device sets a display range and a reset range as mutually-continuous ranges of adjusting the optical position. The display range is a range in which the virtual image is viewable to a vehicle user. The reset range is a range in which the vehicle user is inhibited from viewing the virtual image. The vehicle head-up display device further comprises a stopper mechanism that holds the optical position at a zero position at an end of the reset range that is opposite the display range. The control system includes: a zero detection unit that detects the zero position by causing the stepping motor to output the rotation in a return-to-zero direction; an initial adjustment unit that, after the zero position is detected, adjusts the optical position to an initial position based on the zero position within the display range by causing the stepping motor to output the rotation in an away-from-zero direction, which is a direction opposite the return-to-zero direction; and a user adjustment unit that, after the adjustment of the initial position, adjusts the optical position to a command position based on the zero position within the display range by causing the stepping motor to output the rotation responsive to a command from the vehicle user. The zero detection unit sets the rotation speed of the stepping motor to a higher value than the user adjustment unit sets, and the zero detection unit sets an output torque to a lower value than the user adjustment unit sets. The initial adjustment unit sets the rotation speed of the stepping motor to a higher value than the user adjustment unit sets.

According to this vehicle head-up display device, when the initial position is to be adjusted after the zero position is detected, the rotation speed of the stepping motor is higher than when the command position is adjusted. This makes it possible to reduce the time required for the determination of the initial position. Further, when the zero position is detected while the optical position of the reflecting mirror is held by the stopper mechanism, the output torque of the stepping motor is lower than when the command position is adjusted. Therefore, in a rotation transmission path through which a low output torque is transmitted from the stepping motor to the reflecting mirror, even if meshing gears in the speed reducer mechanism become rough when the stepping motor steps out, the roughness of the meshing gears can be reduced and a volume of the obnoxious sound can be reduced. As the time required for the determination of the initial position and the volume of the obnoxious sound are both reduced as described above, the possibility of giving an uncomfortable feeling to the vehicle user can be eliminated. It becomes possible to increase comfort during the use of the vehicle head-up display device.

Further, in the above-described vehicle head-up display device, the zero detection unit may change an electrical angle of a drive signal, which is applied to the stepping motor, by a value corresponding to the whole adjustment range (ΔPa) of the optical position.

According to the above-described configuration, when the zero position is to be detected, the electrical angle change amount of the drive signal applied to the stepping motor corresponds to the whole adjustment range for the optical position of the reflecting mirror. Thus, the zero position can be surely reached to accurately detect the zero position irrespective of the optical position of the reflecting mirror. Consequently, the initial position and the command position can be accurately adjusted on the basis of the zero position. This makes it possible to avoid a situation where an uncomfortable feeling is given to the vehicle user due to inaccurate adjustment of the initial position or command position, that is, a situation where decreased comfort is provided. Further, particularly when the deviation from the zero position is smaller than at the beginning of detection, the zero position can be detected during the repetition of a step-out because the optical position of the reflecting mirror is held by the stopper mechanism at an early stage and the electrical angle of the stepping motor continuously changes. In this instance, the vehicle head-up display device for which a low output torque is set is capable of decreasing the volume of an obnoxious sound each time the stepping motor steps out. As a result, the vehicle head-up display device contributes to the increase of comfort.

EMBODIMENTS FOR CARRYING OUT INVENTION

An embodiment of the present disclosure will now be described with reference to the accompanying drawings.

Figure 1:
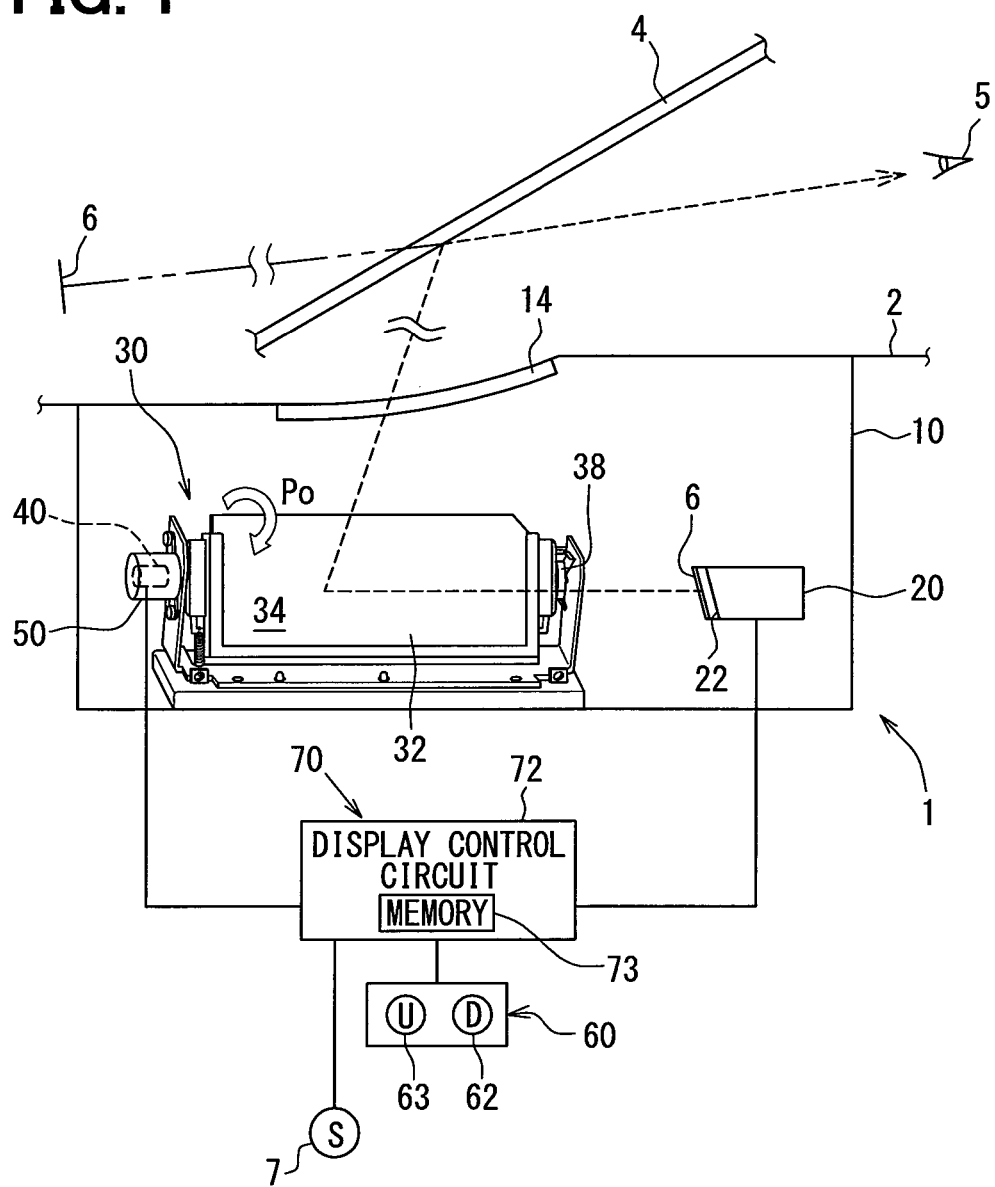
FIG. 1 is a schematic diagram illustrating a configuration of a vehicle HUD device according to an embodiment of the present disclosure.

As illustrated in FIG. 1, a vehicle HUD device 1 according to the embodiment, which is to be mounted in a vehicle, includes a housing 10, a projector 20, an optical system 30, a stepping motor 40, a speed reducer mechanism 50, a command switch 60, and a control system 70.

The housing 10, which is hollow, is mounted to an instrument panel 2 of the vehicle to house the vehicle HUD device 1 and other elements, for example, elements 20, 30, 40, 50. The housing 10 has a translucent emitting window 14. The emitting window 14 is disposed at a location that vertically faces a windshield 4 secured to the front of a driver's seat of the vehicle.

The projector 20 in the present embodiment is a translucent liquid-crystal panel or organic EL panel and provided with a display screen 22. When the display screen 22 is transilluminated by a built-in backlight (not shown), the projector 20 projects a light image 6 that is displayed on the display screen 22. The display light image 6 of the projector 20 conveys vehicle-related information concerning a vehicle driving operation or a vehicle state, such as vehicle speed information and navigation information depicted, for instance, in FIG. 2. The display light image 6 of the projector 20 may convey physical quantity information, such as remaining fuel amount information and cooling water temperature information, and information about the outside of the vehicle, such as traffic condition information and safety status information.

Figure 2:
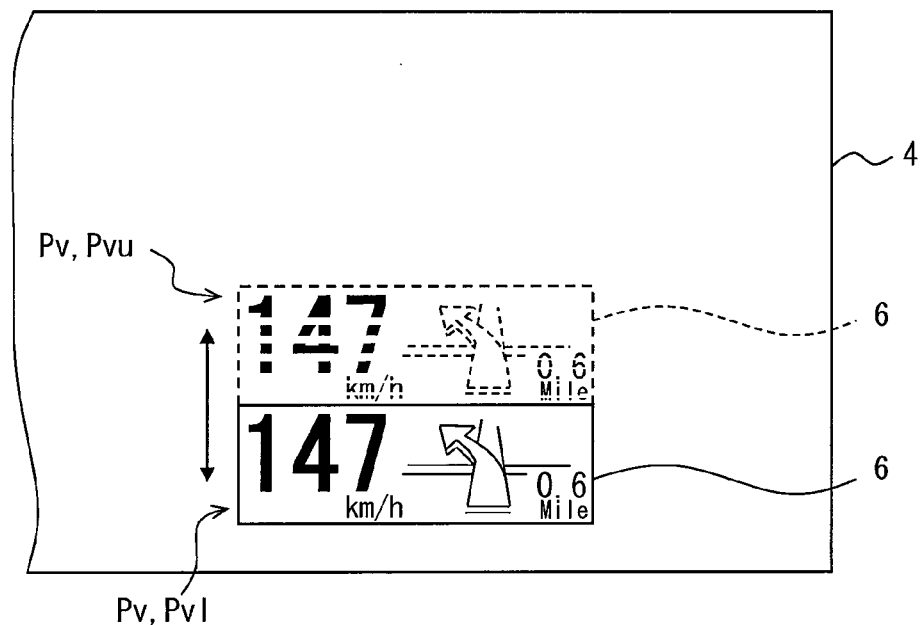
FIG. 2 is a schematic diagram illustrating how a virtual image is displayed by the vehicle HUD device in FIG. 1.

As illustrated in FIG. 1, the optical system 30 includes a reflecting mirror 32 and a plurality of other optical members (optical members other than the reflecting mirror 32 are not shown). The reflecting mirror 32 in the present embodiment is a concave mirror having a smoothly curved concave reflection surface 34. The reflecting mirror 32 magnifies the display light image that is projected from the projector 20 and directly or indirectly incident on the reflection surface 34, and reflects the magnified light image 6 toward the emitting window 14. The display light image 6 reflected from the reflecting mirror 32 is projected onto the windshield 4 of the vehicle through the emitting window 14 to form an image ahead of the windshield 4. As a result, the vehicle-related information conveyed by the display light image 6 of the projector 20 is displayed as depicted in FIG. 2 as a virtual image that is viewed by a vehicle user 5 in the driver's seat in the vehicle.

Figure 3:
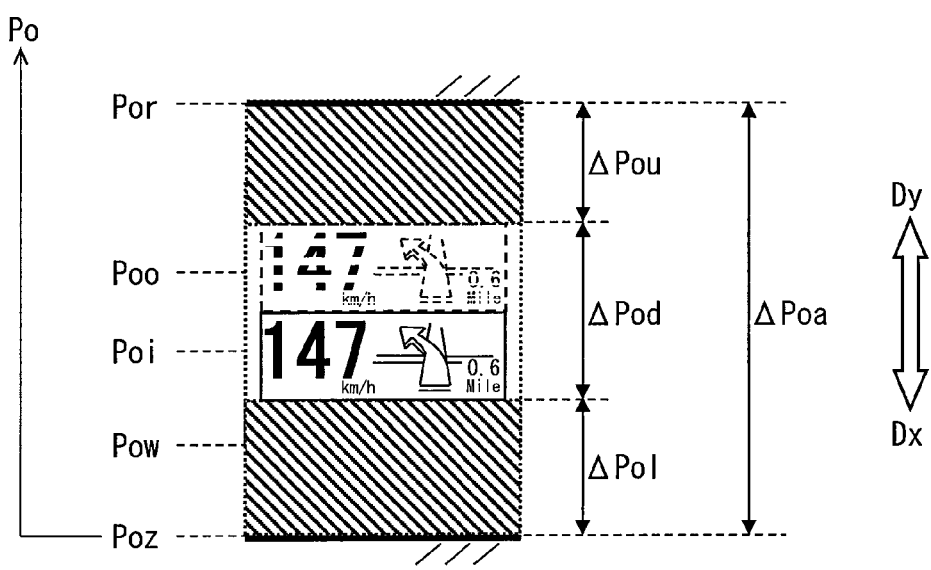
FIG. 3 is a schematic diagram illustrating the optical position of a reflecting mirror depicted in FIG. 1.

As illustrated in FIG. 1, the reflecting mirror 32 includes a rotation shaft 38 that is rotatably supported by the housing 10. When the rotation shaft 38 rotates, the optical position Po of the reflecting mirror 32 is adjusted around the rotation shaft 38. This causes the virtual image position Pv of the display light image 6 to move in an up-down direction of the vehicle as illustrated in FIG. 2. In this instance, the virtual image position Pv indicated by a solid line in FIG. 2 is a lower-limit position Pvl at which the display light image 6 can be viewed by the vehicle user 5. Meanwhile, the virtual image position Pv indicated by a broken line in FIG. 2 is an upper-limit position Pvu at which the display light image 6 can be viewed by the vehicle user 5. A display range ΔPod depicted in FIG. 3 is then set for the reflecting mirror 32 as an adjustment range for the optical position Po corresponding to a range between the limit positions Pvl, Pvu. This enables the vehicle user 5 to view the display light image 6 within the display range ΔPod.

Besides, reset ranges ΔPol, ΔPou depicted in FIG. 3 are set for the reflecting mirror 32 as optical position Po adjustment ranges that sandwich the display range ΔPod. This inhibits the vehicle user 5 from viewing the display light image 6 within the reset ranges ΔPol, ΔPou. More specifically, the lower reset range ΔPol is contiguous to one of both ends of the display range ΔPod that corresponds to the lower-limit position Pvl. A zero position Poz is set at one of both ends of the lower reset range ΔPol that is opposite the display range ΔPod. Meanwhile, the upper reset range ΔPou is contiguous to one of both ends of the display range ΔPod that corresponds to the upper-limit position Pvu. A return position Por is set at one of both ends of the upper reset range ΔPou that is opposite the display range ΔPod. As the above-described configuration is employed, the whole adjustment range ΔPa of the optical position Po coincides with a range between the zero position Poz and the return position Por (that is, ΔPol+ΔPod+ΔPou).

Figure 4:
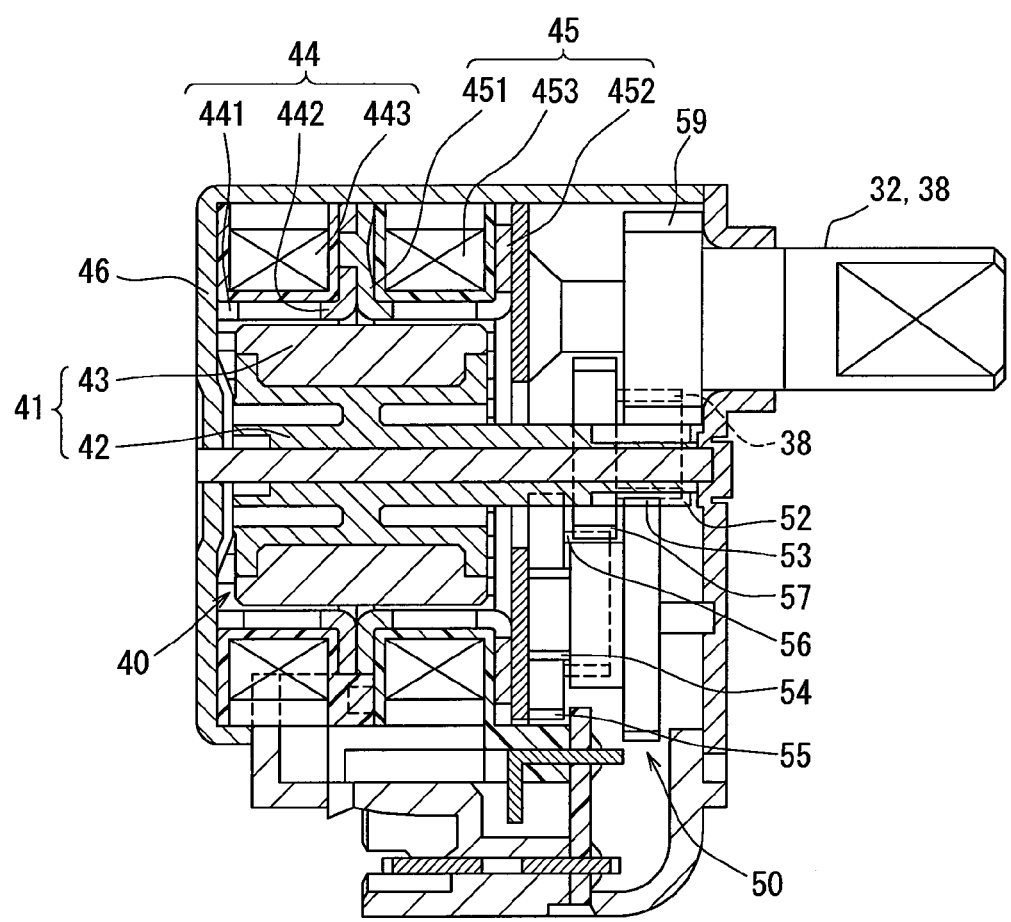
FIG. 4 is an enlarged cross-sectional view illustrating a stepping motor and a speed reducer mechanism that are depicted in FIG. 1.
Figure 5:
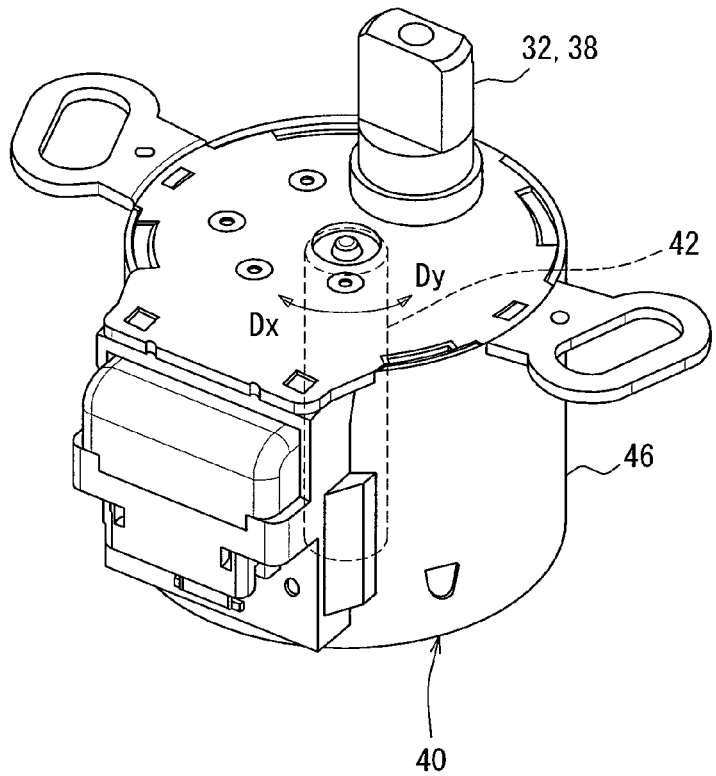
FIG. 5 is an enlarged perspective view illustrating the stepping motor and the speed reducer mechanism that are depicted in FIG. 1.

As illustrated in FIGS. 4 and 5, the stepping motor 40 is a permanent magnet motor having a claw-pole structure. The stepping motor 40 has a casing 46, a rotor 41, and stators 44, 45. The casing 46, which is hollow, is retained by the housing 10 (see FIG. 1) to house the other elements 41, 44, 45 of the stepping motor 40. The rotor 41 is formed of a magnet rotor 43 that is assembled around the outer circumstance of a motor shaft 42. The motor shaft 42 is rotatably supported by the casing 46. The motor shaft 42 in the present embodiment rotates in a return-to-zero direction Dx and in an away-from-zero direction Dy, which are depicted in FIG. 5. As illustrated in FIG. 4, the magnet rotor 43 has a plurality of sets of opposing magnetic poles, which are formed of a permanent magnet.

The stators 44, 45 of two phases are retained by the casing 46 at the outer circumference of the rotor 41. The A-phase stator 44 includes magnetic yokes 441, 442 and a coil 443. The B-phase stator 45 includes magnetic yokes 451, 452 and a coil 453. The coil 443 disposed coaxially with the magnetic yokes 441, 442 in the A-phase is axially displaced from the coil 453 disposed coaxially with the magnetic yokes 451, 452 in the B-phase. As the above-described configuration is employed, the stepping motor 40 rotates the motor shaft 42 as well as the magnet rotor 43 when drive signals are applied to excite the A- and B-phase coils 443, 453.

Figure 6:
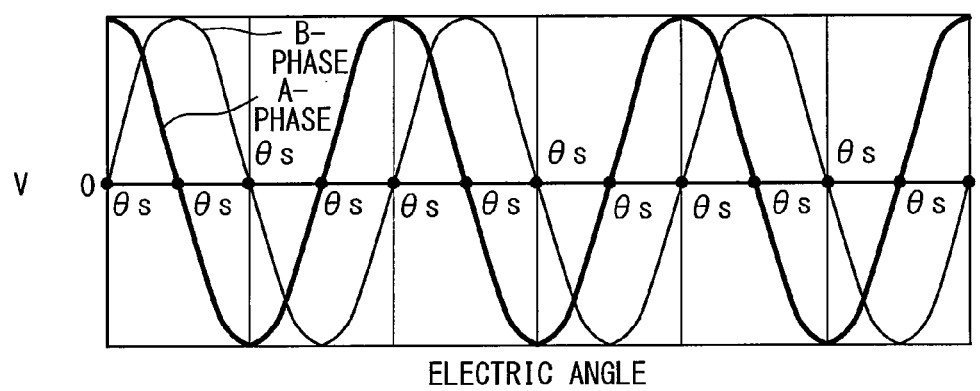
FIG. 6 is a characteristic diagram illustrating a drive signal applied to the stepping motor depicted in FIG. 1.

Here, it is assumed that the drive signal applied to the A-phase coil 443 follows a cosine function that alternates a voltage amplitude V on the basis of an electrical angle as indicated by a thick solid-line graph in FIG. 6. Further, it is assumed that the drive signal applied to the B-phase coil 453 follows a sine function that alternates the voltage amplitude V on the basis of the electrical angle as indicated by a thin solid-line graph in FIG. 6. As the drive signals are applied as described above, an electrical stability point θs arises in the stepping motor 40 at electrical angle intervals of substantially 90 degrees. In the subsequent description, the drive signals applied to the A- and B-phase coils 443, 453 are simply referred to as the "drive signals."

As illustrated in FIG. 4, the speed reducer gear mechanism 50 is configured so that a plurality of gears 52-59 are in series engagement within the casing 46. More specifically, an initial gear is formed on the motor shaft 42. A first idler gear 53 and a first pinion gear 54 are supported by the casing 46 in such a manner that the first idler gear 53 and the first pinion gear 54 are integrally rotatable. As the first idler gear 53 meshes with the initial gear 52, the rotation of the motor shaft 42 is subject to speed-reduction and transmitted to the first pinion gear 54. A second idler gear 55 and a second pinion gear 56 are supported by the casing 46 in such a manner that the second idler gear 55 and the second pinion gear 56 are integrally rotatable. As the second idler gear 55 meshes with the first pinion gear 54, the rotation of the first pinion gear 54 is further subject to speed-reduction and transmitted to the second pinion gear 56. A third idler gear 57 and a third pinion gear 58 are supported by the casing 46 in such a manner that the third idler gear 57 and the third pinion gear 58 are integrally rotatable. As the third idler gear 57 meshes with the second pinion gear 56, the rotation of the second pinion gear 56 is further subject to speed-reduction and transmitted to the third pinion gear 58. A final gear 59 is formed on the rotation shaft 38 (see FIGS. 4 and 5) to mesh with the third pinion gear 58. The rotation of the third pinion gear 58 is further subject to speed-reduction and transmitted to the reflecting mirror 32.

As the speed reducer gear mechanism 50, which forms the above-described rotation transmission path, reduces the speed of the rotation outputted from the motor shaft 42 in the return-to-zero direction Dx and transmits the speed-reduced rotation to the reflecting mirror 32, the optical position Po of the reflecting mirror 32 is changed toward the zero position Poz depicted in FIG. 3. Meanwhile, as the speed reducer gear mechanism 50 reduces the speed of the rotation in the away-from-zero direction Dy, which is outputted from the motor shaft 42 toward a direction opposite the return-to-zero direction Dx, and transmits the speed-reduced rotation to the reflecting mirror 32, the optical position Po of the reflecting mirror 32 is changed toward the return position Por depicted in FIG. 3.

Figure 7:
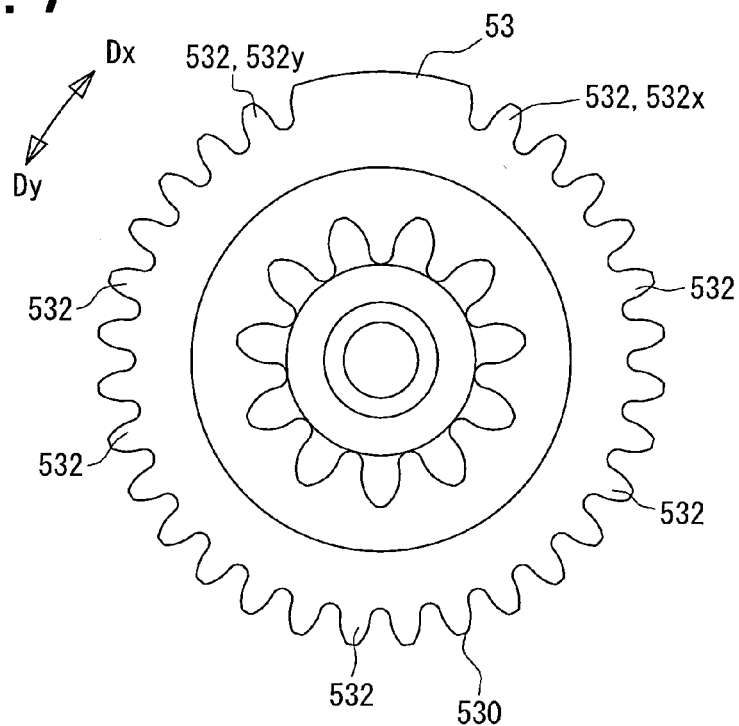
FIG. 7 is a plan view illustrating a stopper gear portion of the speed reducer mechanism depicted in FIG. 4.

The first idler gear 53, which is one of the gears 52-59 in the present embodiment, includes a stopper gear portion 530, which is shaped like a partial gear, as illustrated in FIG. 7. More specifically, the stopper gear portion 530 is formed in a region of the first idler gear 53 that has a rotation direction angle of less than 360 degrees. A plurality of teeth 532 are successively formed only within that region. Because the above configuration is employed, when a tooth 532x at one end of the stopper gear portion 530 meshes with the initial gear 52 as the rotation in the return-to-zero direction Dx is outputted from the motor shaft 42, the optical position Po of the reflecting mirror 32 is held at the zero position Poz. Meanwhile, when a tooth 532y at the opposite end of the stopper gear portion 530 meshes with the initial gear 52 as the rotation in the away-from-zero direction Dy is outputted from the motor shaft 42, the optical position Po of the reflecting mirror 32 is held at the return position Por.

As can be seen from above, in the present embodiment in which the stopper gear portion 530 functions as a "stopper mechanism," the optical position Po can be adjusted within the whole adjustment range ΔPa between the zero position Poz and the return position Por as indicated in FIG. 3.

The command switch 60 depicted in FIG. 1 is mounted, for instance, on a steering wheel of the vehicle and operable by the vehicle user 5 in the driver's seat. The command switch 60 includes, for example, two different push-type operating members 62, 63. More specifically, in response to an operation performed by the vehicle user 5, the downward operating member 62 receives a downward adjustment command to move the virtual image position Pv of the display light image 6 downward. In contrast, the upward operating member 63, in response to an operation performed by the vehicle user 5, receives an upward adjustment command to move the virtual image position Pv of the display light image 6 upward. The command switch 60, which is configured as described above, distinctively outputs a command signal for the downward adjustment command inputted by operating the downward operating member 62 or a command signal for the upward adjustment command inputted by operating the upward operating member 63.

The control system 70 includes a display control circuit 72 that is disposed inside or outside the housing 10. The display control circuit 72 in the present embodiment is an electric circuit that is mainly formed of a microcomputer and provided with a built-in memory 73. The display control circuit 72 is electrically connected to the projector 20, the command switch 60, and the coils 443, 453. The display control circuit 72 not only controls the projection of the display light image 6 from the projector 20, but also controls the rotation of the stepping motor 40 in accordance with a command signal outputted from the command switch 60. More specifically, based on the command signal for the downward adjustment command, the display control circuit 72 moves the virtual image position Pv of the display light image 6 downward by controlling the electrical angles of the drive signals in the return-to-zero direction Dx in order to change the optical position Po of the reflecting mirror 32 toward the zero position Poz. In contrast, based on the command signal for the upward adjustment command, the display control circuit 72 moves the virtual image position Pv of the display light image 6 upward by controlling the electrical angles of the drive signals in the away-from-zero direction Dy in order to change the optical position Po toward the return position Por.

Figure 8:
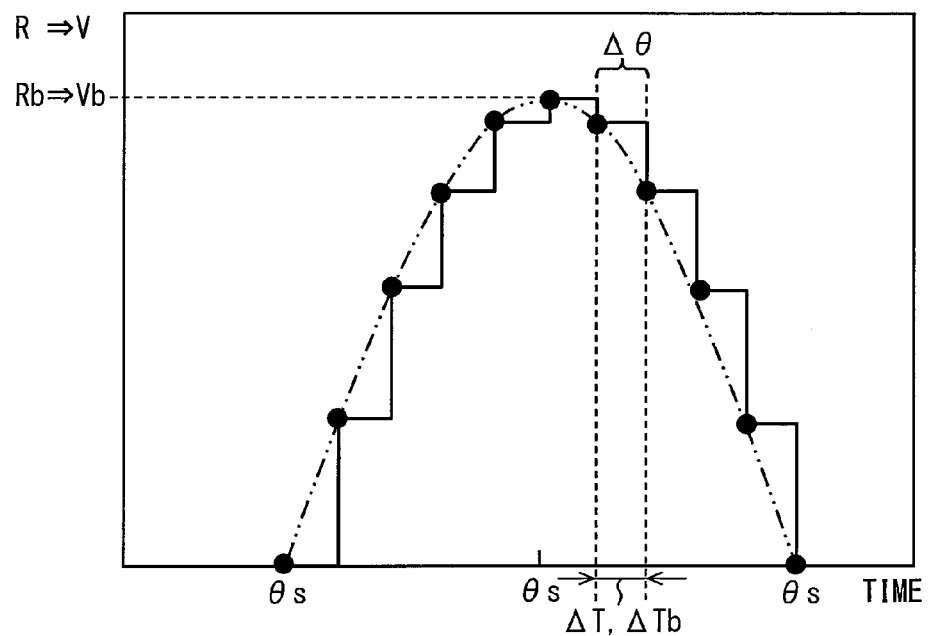
FIG. 8 is a characteristic diagram illustrating how electrical angle control is executed over the drive signal depicted in FIG. 6.
Figure 9:
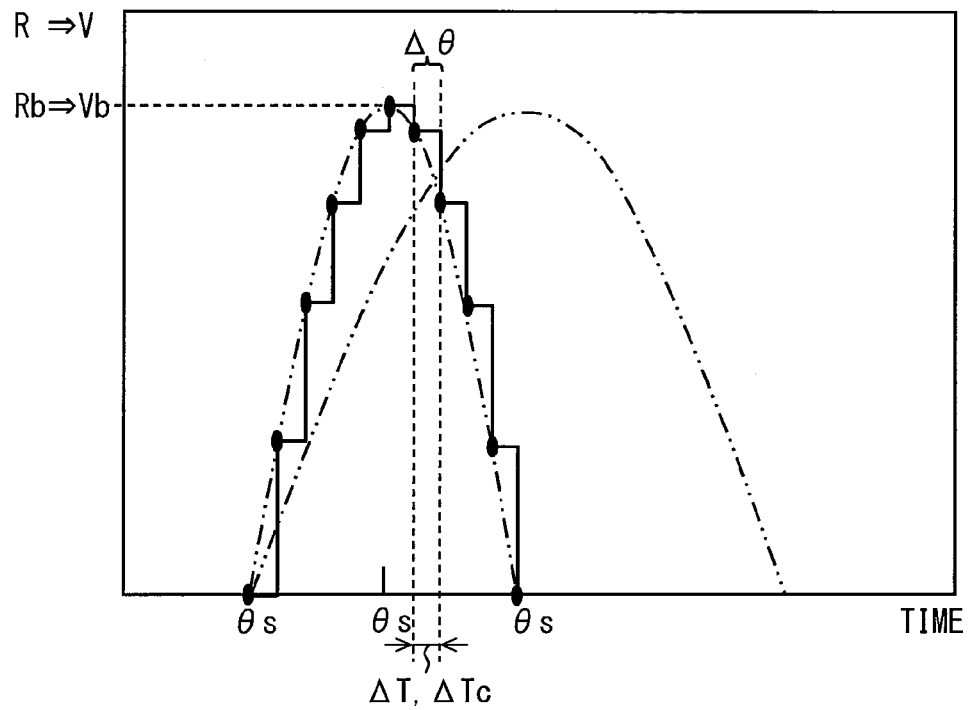
FIG. 9 is a characteristic diagram illustrating how electrical angle control is executed over the drive signal depicted in FIG. 6.
Figure 10:
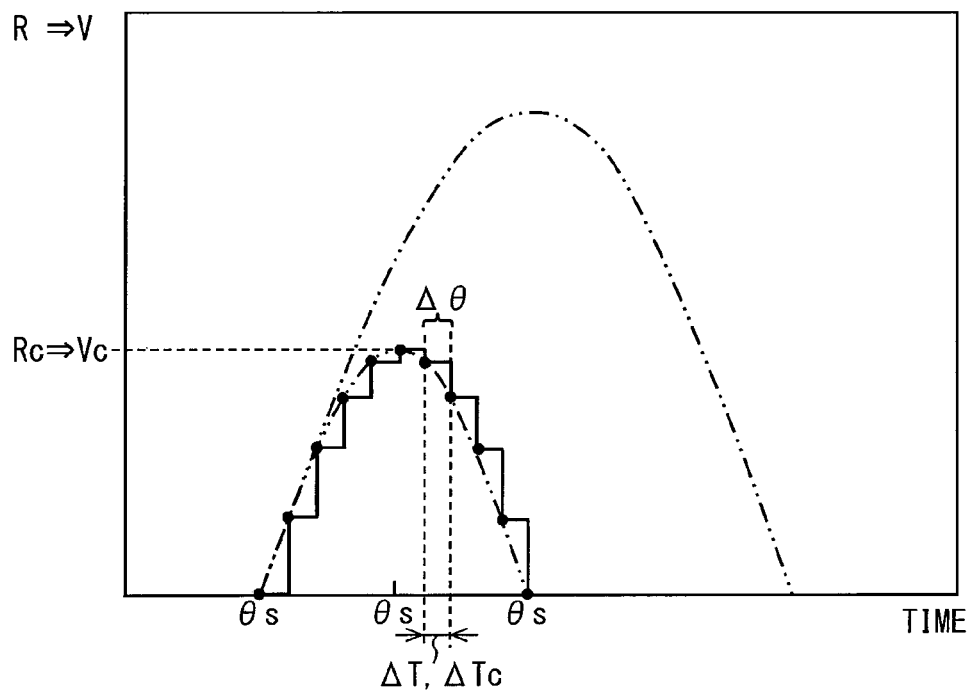
FIG. 10 is a characteristic diagram illustrating how electrical angle control is executed over the drive signal depicted in FIG. 6.

The display control circuit 72 executes electrical angle control over the drive signals by using a combination of micro-step drive and pulse-width modulation. In micro-step drive in the present embodiment, when control is executed to change the electrical angles of the drive signals in angle steps Δθ smaller than the intervals of electrical stability points θs as depicted in FIGS. 8 to 10, the time required for causing a change corresponding to one angle step Δθ is adjusted as a control interval ΔT. As a result, a correction control interval ΔTc depicted in FIGS. 9 and 10 is reduced, for example, to a half value with respect to a reference control interval ΔTb depicted in FIG. 8. In pulse-width modulation in the present embodiment, when control is executed to change the on-duty ratios R of the drive signals in order to apply a necessary change to the voltage amplitude V at each angle step Δθ as depicted in FIGS. 8 to 10, the on-duty ratios R are adjusted. As a result, a correction voltage amplitude Vc depicted in FIG. 10 and a correction on-duty ratio Rc giving the correction voltage amplitude Vc are reduced, for example, to a half value at each angle step Δθ with respect to a reference voltage amplitude Vb depicted in FIGS. 8 and 9 and a reference on-duty ratio Rb giving the reference voltage amplitude Vb. In FIGS. 8 to 10, only the maximum amplitude out of the voltage amplitude V at each angle step Δθ is designated by the symbols Vb, Vc and associated with the duty ratios Rb, Rc. Amplitudes other than the maximum amplitude are not designated by the symbols Vb, Vc and not associated with the duty ratios Rb, Rc.

The display control circuit 72, which executes electrical angle control as described above, is also electrically connected to an engine switch 7 of the vehicle. As adjustment of the optical position Po in response to the turn on of the engine switch 7, the display control circuit 72 detects the zero position Poz within the lower reset range ΔPol and thereafter sets an initial position Poi exemplified in FIG. 3 within the display range ΔPod on the basis of the detected zero position Poz. Further, the display control circuit 72 adjusts the optical position Po in accordance with the downward adjustment command or the upward adjustment command by setting a command position Poo exemplified in FIG. 3 within the display range ΔPod on the basis of the zero position Poz. Furthermore, as adjustment of the optical position Po in response to the turn off of the engine switch 7, the display control circuit 72 sets a standby position Pow exemplified in FIG. 3 within the lower reset range ΔPol on the basis of the zero position Poz. In the subsequent description, a mode for detecting the zero position Poz is referred to as the "zero detection mode," a mode for adjusting the initial position Poi is referred to as the "initial adjustment mode," a mode for adjusting the command position Poo is referred to as the "user adjustment mode," and a mode for adjusting the standby position Pow is referred to as the "standby adjustment mode."

Figure 11:
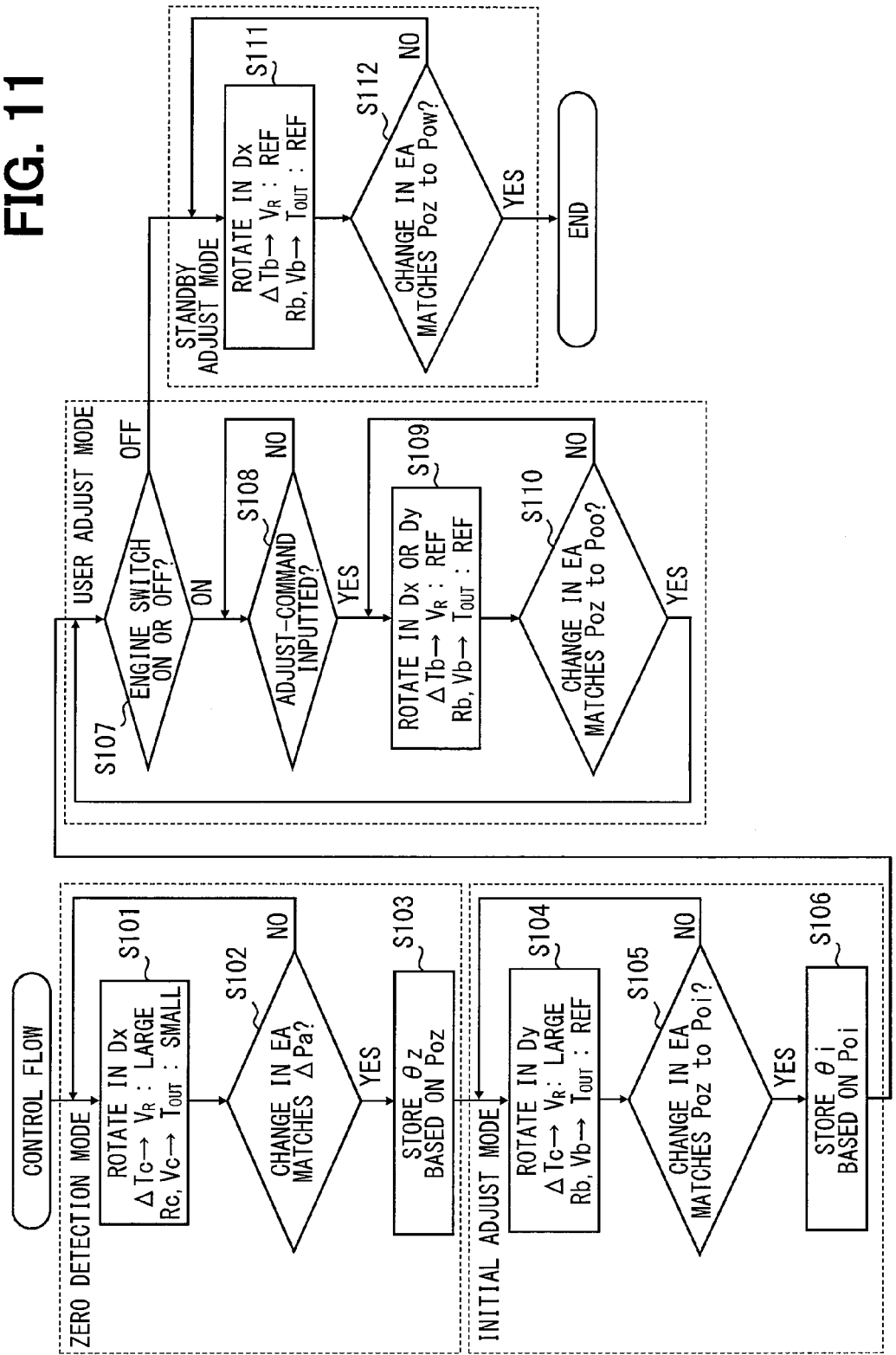
FIG. 11 is a flowchart illustrating how control is executed by a display control circuit depicted in FIG. 1.

A drive signal control flow that is executed by the display control circuit 72 in accordance with a computer program will now be described in detail with reference to FIG. 11. This drive signal control is initiated when the engine switch 7 is turned on. While the drive signal control is executed, the display control circuit 72 executes projection control of the display light image 6 on an as-needed basis. The computer program may be stored in the memory 73 or in another storage device.

In step S101 of the control flow, the motor shaft 42 is rotated in the return-to-zero direction Dx in the zero detection mode. In this instance, the present embodiment controls the electrical angles (abbreviated to EA in the drawings) of the drive signals by using micro-step drive and pulse-width modulation as depicted in FIG. 10. In micro-step drive, a step operation is performed at the correction control intervals ΔTc. Pulse-width modulation is performed at the correction on-duty ratio Rc. In other words, the present embodiment uses the control intervals ΔTc, which are shorter than the reference control intervals ΔTb, and the on-duty ratio Rc, which is lower than the reference on-duty ratio Rb and gives the correction voltage amplitude Vc. This ensures that the rotation speed (abbreviated to $V_R$ in the drawings) of the stepping motor 40 is higher than a reference value in the user adjustment mode, which will be described later in detail, and that the output torque (abbreviated to $T_{OUT}$ in the drawings) of the stepping motor 40 is lower than a reference value in the user adjustment mode, which will be described later in detail.

In step S102, which follows step S101 above, a check is performed to determine whether the amount of electrical angle change since the beginning of the zero detection mode agrees with a value corresponding to the whole adjustment range ΔPa of the optical position Po. While the result obtained in step S102 indicates disagreement, processing returns to step S101 so that the motor shaft 42 continuously rotates in the return-to-zero direction Dx. If, in contrast, the result indicates agreement, it is assumed that the zero position Poz is detected. The rotation of the motor shaft 42 is then stopped, and processing proceeds to step S103.

In step S103, the electrical angle, which was controlled in most recently performed step S101, is stored in the memory 73 as a zero point θz corresponding to the detected zero position Poz. When steps S101 to S103 above are performed, the zero detection mode is completed. In the zero detection mode, which is used in steps S101 to S103, the virtual image display of the display light image 6 is turned off.

In step S104, which is performed immediately after the above-described end of the zero detection mode, the motor shaft 42 is rotated in the away-from-zero direction Dy in the initial adjustment mode. In this instance, the present embodiment controls the electrical angles of the drive signals by using micro-step drive and pulse-width modulation as depicted in FIG. 9. In micro-step drive, a step operation is performed at the correction control intervals ΔTc. Pulse-width modulation is performed at the reference on-duty ratio Rb. In other words, the present embodiment uses the control intervals ΔTc, which are shorter than the reference control intervals ΔTb, and the on-duty ratio Rb, which gives the reference voltage amplitude Vb. This ensures that the rotation speed of the stepping motor 40 is higher than a reference value in the user adjustment mode, which will be described later in detail, although the output torque of the stepping motor 40 is equal to a reference value in the user adjustment mode, which will be described later in detail.

In step S105, which follows step S104 above, a check is performed to determine whether the amount of electrical angle change since the beginning of the initial adjustment mode agrees with a value corresponding to a portion between the zero position Poz and the initial position Poi. While the result obtained in step S105 indicates disagreement, processing returns to step S104 so that the motor shaft 42 continuously rotates in the away-from-zero direction Dy. If, in contrast, the result indicates agreement, it is assumed that the optical position Po is adjusted to the initial position Poi on the basis of the zero position Poz, which is based on the zero point θz stored in the memory 73. The rotation of the motor shaft 42 is then stopped, and processing proceeds to step S106.

In step S106, the electrical angle, which was controlled in most recently performed step S104, is stored in the memory 73 as an initial point θi corresponding to the adjusted initial position Poi. Therefore, the initial position Poi, which is handled as an adjustment target as a result of determination in most recent step S105, corresponds to the initial point θi that was stored in the memory 73 when the control flow was executed last. When steps S104 to S106 are performed, the initial adjustment mode terminates. In the initial adjustment mode in which steps S104 to S106 are performed, the virtual image display of the display light image 6 is turned off. When the initial adjustment mode terminates, the virtual image display of the display light image 6 begins.

In step S107, which is performed immediately after the above-described end of the initial adjustment mode, a check is performed to determine whether the engine switch (abbreviated to E-SW in the drawings) 7 is on or off. If the result obtained in step S107 indicates that the engine switch 7 is on, processing proceeds to step S108.

Step S108 is performed to wait until the downward adjustment command or the upward adjustment command is inputted. If the downward adjustment command is inputted, processing proceeds to step S109, and the motor shaft 42 is rotated in the return-to-zero direction Dx on the basis of the downward adjustment command. If, in contrast, the upward adjustment command is inputted, processing proceeds to step S109, and the motor shaft 42 is rotated in the away-from-zero direction Dy on the basis of the upward adjustment command. In either of these cases, the present embodiment controls the electrical angles of the drive signals by using micro-step drive and pulse-width modulation as depicted in FIG. 8. In micro-step drive, a step operation is performed at the reference control intervals ΔTb. Pulse-width modulation is performed at the reference on-duty ratio Rb. In other words, the present embodiment uses the reference control intervals ΔTb, which are longer than the correction control intervals ΔTc, and the on-duty ratio Rb, which is higher than the correction on-duty ratio Rc. This ensures that the rotation speed of the stepping motor 40 is a reference value lower than in the zero detection mode and the initial adjustment mode, and that the output torque of the stepping motor 40 is a reference value higher than in the zero detection mode and equal to the counterpart in the initial adjustment mode.

In step S110, which follows step S109 above, a check is performed to determine whether the amount of electrical angle change since the beginning of the preceding initial adjustment mode agrees with a value corresponding to a portion between the zero position Poz and the command position Poo. As regards the command position Poo, an electrical angle representing a target optical position Po to which an adjustment is to be made in accordance with one downward adjustment command or one upward adjustment command is stored beforehand in the memory 73. While the result obtained in step S110 indicates disagreement in a situation where the command position Poo is a target, processing returns to step S109 so that the motor shaft 42 continuously rotates in a direction based on the command. If, in contrast, the result indicates agreement, it is assumed that the optical position Po is adjusted to the command position Poo on the basis of the zero position Poz, which is based on the zero point θz stored in the memory 73. The rotation of the motor shaft 42 is then stopped, and processing returns to step S107.

As described above, while the engine switch 7 is determined to be on in step S107, the user adjustment mode continues as steps S107 to S110 are performed. If, in contrast, the engine switch 7 is determined to be off in step S107, the user adjustment mode terminates. In the user adjustment mode in which steps S107 to S110 are performed, the virtual image display of the display light image 6 continues.

If the engine switch 7 is determined to be off in step S107, processing proceeds to step S111 of the standby adjustment mode so that the motor shaft 42 is rotated in the return-to-zero direction Dx. In this instance, the present embodiment controls the electrical angles of the drive signals in the same manner as in step S109.

In step S112, which follows step S111 above, a check is performed to determine whether the amount of electrical angle change since the beginning of the preceding initial adjustment mode agrees with a value corresponding to a portion between the zero position Poz and the standby position Pow. As regards the standby position Pow, an electrical angle representing a target optical position Po to which an adjustment is to be made in the standby adjustment mode is stored beforehand in the memory 73. While the result obtained in step S112 indicates disagreement in a situation where the standby position Pow is a target, processing returns to step S111 so that the motor shaft 42 continuously rotates in the return-to-zero direction Dx. If, in contrast, the result indicates agreement, it is assumed that the optical position Po is adjusted to the standby position Pow on the basis of the zero position Poz, which is based on the zero point θz stored in the memory 73. The rotation of the motor shaft 42 is then stopped, and the standby adjustment mode ends to terminate the control flow. In the standby adjustment mode in which steps S111 to S112 are performed, the virtual image display of the display light image 6 is turned off.

(Operational Advantages)

Operational advantages provided by the above-described vehicle HUD device 1 are described below.

According to the vehicle HUD device 1, when the zero position Poz is detected to adjust the initial position Poi, the rotation speed of the stepping motor 40 is higher than when the command position Poo is adjusted. Therefore, the time required for determining the initial position Poi can be reduced. Further, when the zero position Poz is to be detected while the optical position Po of the reflecting mirror 32 is held by the stopper gear portion 530, the output torque of the stepping motor 40 is lower than when the command position Poo is adjusted. Therefore, in the rotation transmission path through which a low output torque is transmitted from the stepping motor 40 to the reflecting mirror 32, even if the meshing gears 52-59 in the speed reducer gear mechanism 50 become rough when the stepping motor 40 steps out, the roughness of the meshing gears 52-59 can be reduced to decrease the volume of an obnoxious sound. As the time required for the determination of the initial position Poi and the volume of the obnoxious sound are both reduced as described above, the possibility of giving an uncomfortable feeling to the vehicle user 5 can be eliminated to provide increased comfort during the use of the vehicle HUD device 1.

Further, according to the vehicle HUD device 1, the amount of electrical angle change in a drive signal applied to the stepping motor 40 in order to detect the zero position Poz corresponds to the whole adjustment range ΔPa of the optical position Po of the reflecting mirror 32. Thus, the zero position Poz can be surely reached to accurately detect the zero position Poz irrespective of the optical position Po of the reflecting mirror 32. Consequently, the initial position Poi and the command position Poo can be accurately adjusted on the basis of the zero position Poz. This makes it possible to avoid a situation where an uncomfortable feeling is given to the vehicle user 5 due to inaccurate adjustment of the initial position Poi or command position Poo, that is, a situation where decreased comfort is provided. Besides, particularly when the deviation from the zero position Poz is smaller than at the beginning of detection, the zero position Poz can be detected during the repetition of a step-out because the optical position Po of the reflecting mirror 32 is held by the stopper gear portion 530 at an early stage and the electrical angle of the stepping motor 40 continuously changes. In this instance, the vehicle HUD device 1 for which a low output torque is set is capable of decreasing the volume of an obnoxious sound each time the stepping motor steps out. As a result, the vehicle HUD device 1 contributes to the increase of comfort.

Furthermore, when the zero position Poz is to be detected in the vehicle HUD device 1, an abrupt change in effective current flowing to the stepping motor 40 can be suppressed in angle steps Δθ by a drive signal that is variably controlled to an electrical angle in angle steps Δθ smaller than the intervals of electrical stability points θs. Thus, an abrupt change in the output torque of the stepping motor 40 can also be suppressed. This makes it possible to alleviate an impact that is applied when the stopper gear portion 530 holds the reflecting mirror 32 or when the stepping motor 40 steps out. Consequently, the volume of an obnoxious sound generated by such an impact can be decreased to contribute to the increase of comfort.

Moreover, according to the vehicle HUD device 1, when the zero position Poz is to be detected to adjust the initial position Poi, a drive signal whose control interval ΔT for electrical angle change control is shorter than the counterpart for adjusting the command position Poo is applied to the stepping motor 40. When the control interval ΔT is shortened as mentioned above, the rotation speed of the stepping motor 40 can be accurately increased. Therefore, the time required for determining the initial position Poi can be surely decreased to contribute to the increase of comfort.

Besides, according to the vehicle HUD device 1, when the zero position Poz is to be detected while the optical position Po of the reflecting mirror 32 is held by the stopper gear portion 530, a drive signal whose on-duty ratio R for pulse-width modulation is lower than the counterpart for adjusting the command position Poo is applied to the stepping motor 40. When the on-duty ratio R is lowered as mentioned above, the output torque of the stepping motor 40 can be surely decreased. Therefore, the volume of an obnoxious sound generated when the stepping motor 40 steps out can be surely decreased to contribute to the increase of comfort.

In addition, according to the vehicle HUD device 1, when the detected zero position Poz is used as the reference, the optical position Po of the reflecting mirror 32 can be accurately adjusted to the standby position Pow in response to the turning off of the engine switch 7 of the vehicle. In this instance, the standby position Pow is within the lower reset range ΔPol that inhibits the display light image 6 from being viewed. Therefore, while an engine of the vehicle is stopped, extraneous light reflected from the reflecting mirror 32 is inhibited from being incident on eyes of the vehicle user 5. This makes it possible to avoid a situation where an uncomfortable feeling is given to the vehicle user 5. Further, when the zero position Poz is detected in response to the turning on of the engine switch 7, the reflecting mirror 32 rotates from the standby position Pow within the lower reset range ΔPol toward the zero position Poz within the same range ΔPol. Consequently, while the zero position Poz is detected, it is possible to avoid not only a situation where the extraneous light reflected from the reflecting mirror 32 is incident on the eyes of the vehicle user 5, but also a situation where an increased uncomfortable feeling is given to the vehicle user 5 due to a change in the incident position of reflected extraneous light. As a result, increased comfort can be provided during the use of the vehicle HUD device.

As can be seen from the above description, in the vehicle HUD device 1, the display control circuit 72 executing the zero detection mode in steps S101 to S103 corresponds to "a zero detection means and a zero detection unit." Further, the display control circuit 72 executing the initial adjustment mode in steps S104 to S106 corresponds to "an initial adjustment means and an initial adjustment unit." Furthermore, the display control circuit 72 executing the user adjustment mode in steps S107 to S110 corresponds to "a user adjustment means and a user adjustment unit." Moreover, the display control circuit 72 executing the standby adjustment mode in steps S111 and S112 corresponds to "a standby adjustment means and a standby adjustment unit."

Alternative Embodiments

Although an embodiment of the present disclosure has been described, the present disclosure is not limited to the embodiment described above. Alternatively, the pressure disclosure may have various configurations.

Figure 12:
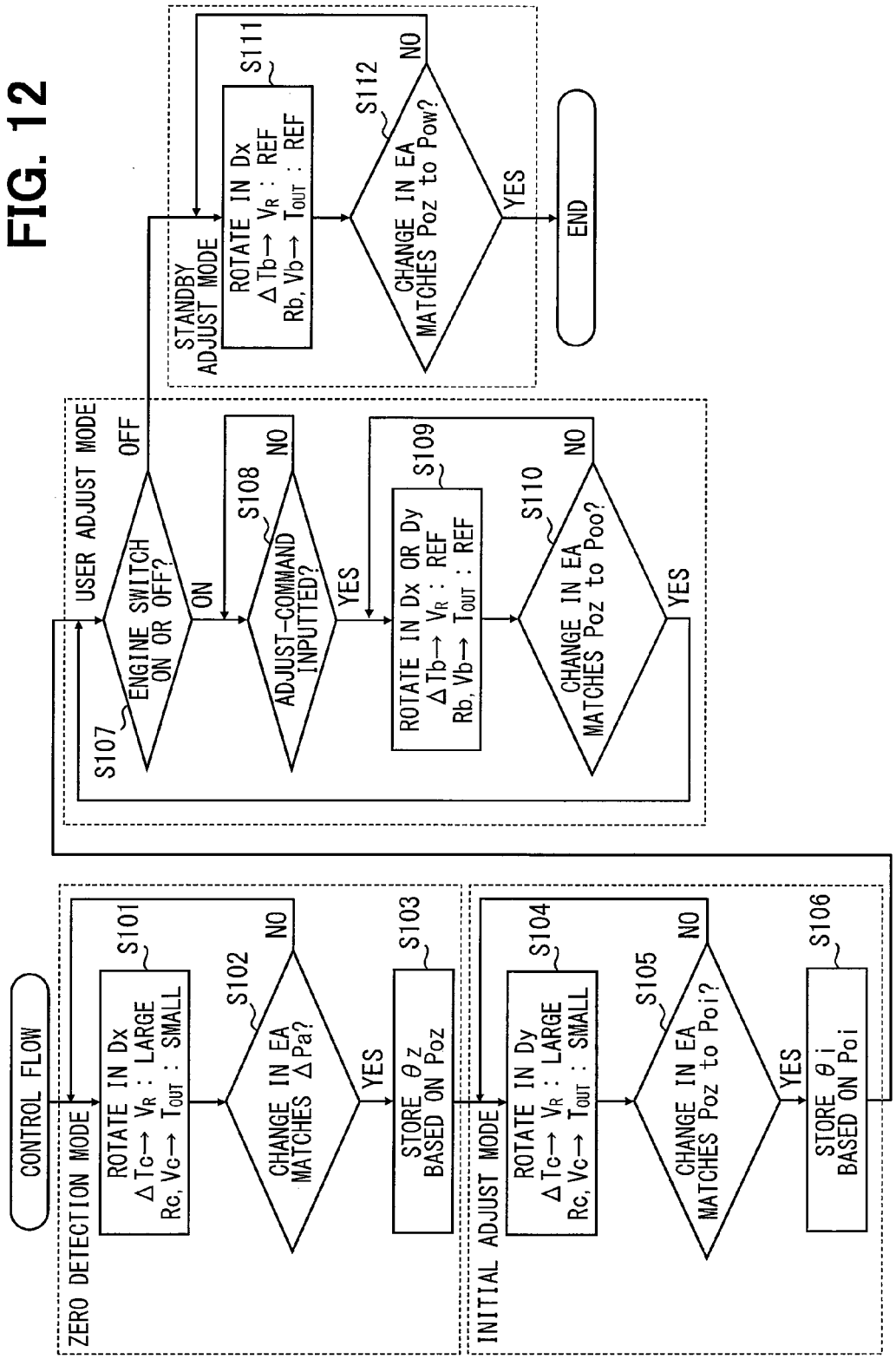
FIG. 12 is a flowchart illustrating an exemplary modification of FIG. 11.

More specifically, as a first modification, for example, in step S104 of the initial adjustment mode, the correction on-duty ratio Rc giving the correction voltage amplitude Vc, that is, the on-duty ratio Rc lower than the reference on-duty ratio Rb giving the reference voltage amplitude Vb, may be employed as indicated in FIG. 12. In this instance, the output torque of the stepping motor 40 is lower than the reference value in the user adjustment mode, as is the case with step S101 of the zero detection mode.

Figure 13:
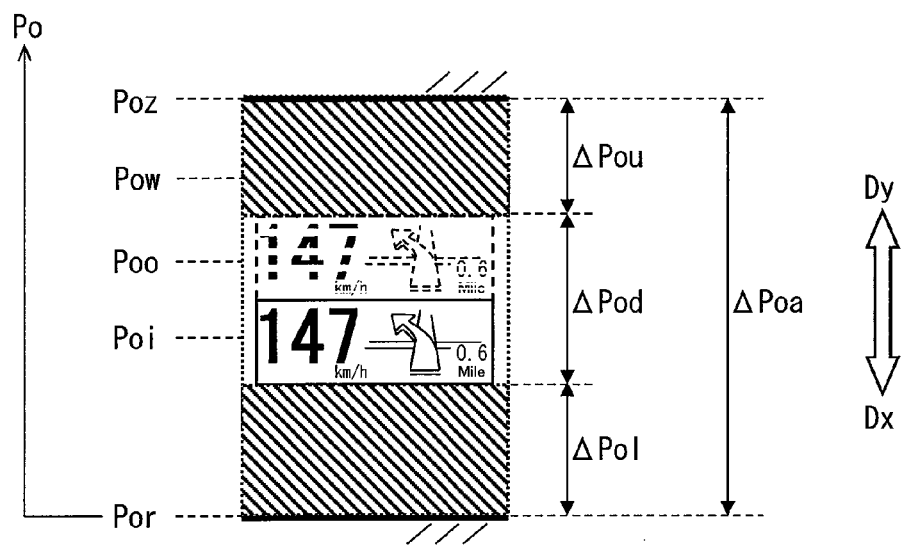
FIG. 13 is a schematic diagram illustrating an exemplary modification of FIG. 3.

As a second modification, the zero position Poz and the return position Por may be interchanged as depicted in FIG. 13. More specifically, the zero position Poz may be set at an end of the upper reset range ΔPou that is opposite the display range ΔPod while the return position Por is set at an end of the lower reset range ΔPol that is opposite the display range ΔPod.

Figure 14:
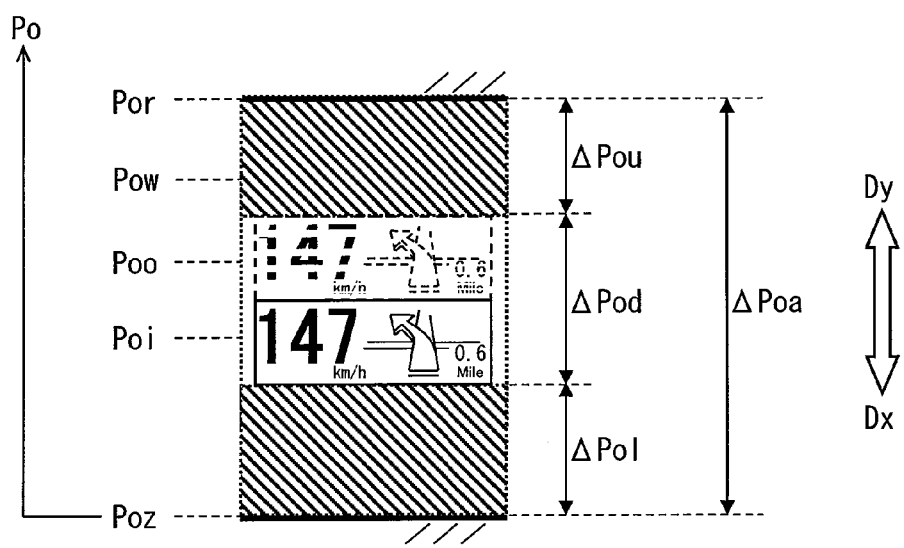
FIG. 14 is a schematic diagram illustrating another exemplary modification of FIG. 3.

As a third modification, the standby position Pow may be set within the upper reset range ΔPou as depicted in FIGS. 13 and 14. FIG. 13 illustrates the third modification in which the zero position Poz and the return position Por are interchanged as suggested in the second modification. FIG. 14, in contrast, illustrates the third modification without interchanging the zero position Poz and the return position Por, that is, by using the zero position Poz and the return position Por in a manner suggested in the foregoing embodiment.

Figure 15:
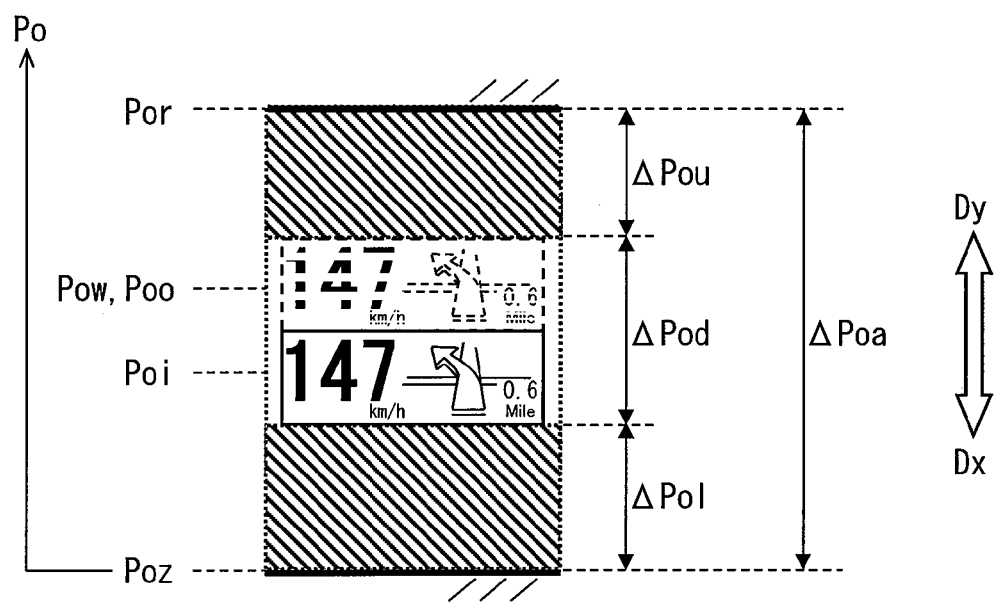
FIG. 15 is a schematic diagram illustrating still another exemplary modification of FIG. 3.
Figure 16:
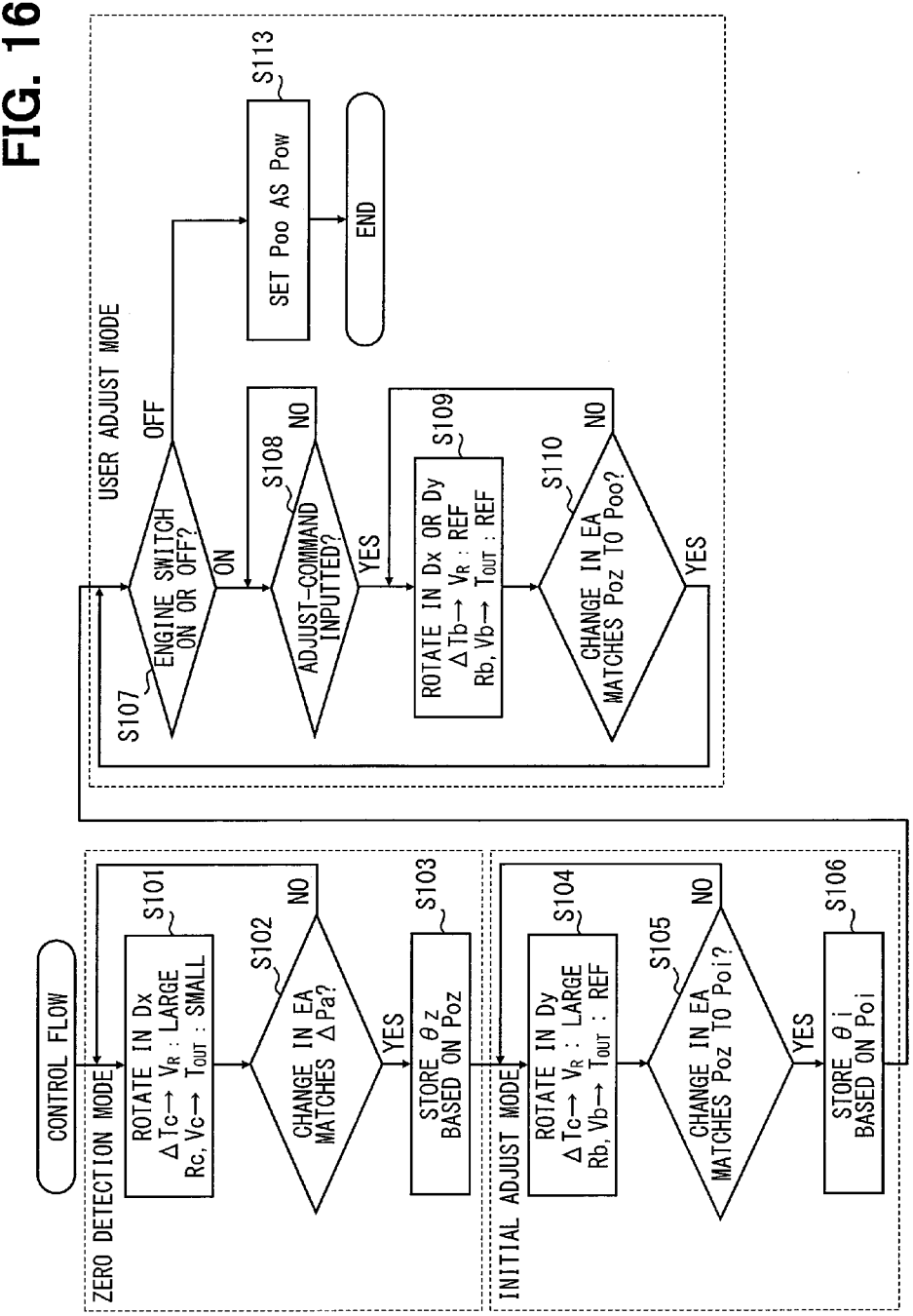
FIG. 16 is a flowchart illustrating another exemplary modification of FIG. 11.

As a fourth modification, the standby position Pow may be set within the display range ΔPod as depicted in FIG. 15. In this instance, step S113 may be performed so as to set the command position Poo obtained upon the turning off of the engine switch 7 as the standby position Pow without executing the standby adjustment mode as indicated in FIG. 16.

As a fifth modification, either one of the upper reset range ΔPou and the lower reset range ΔPol may be left unset. However, if the lower reset range ΔPol is left unset, the zero position Poz is set at an end of the upper reset range ΔPou that is opposite the display range ΔPod as suggested in the second modification. Further, if the lower reset range ΔPol is left unset, an alternative is to set the standby position Pow within the upper reset range ΔPou as suggested in the third modification or set the standby position Pow within the display range ΔPod as suggested in the fourth modification.

As a sixth modification, in step S102 of the zero detection mode, the zero position Poz may be determined to be detected even if the amount of electrical angle change since the beginning of the zero detection mode is smaller than an angle corresponding to the whole adjustment range ΔPa of the optical position Po. For example, the zero position Poz may be detected by measuring voltages induced in the coils 443, 453 in order to verify that the optical position Po has reached the zero position Poz.

As a seventh modification, a full-step drive scheme may be employed to change the electrical angle in a stepped manner at intervals of electrical stability points θs in at least one of step S101 of the zero detection mode, step S104 of the initial adjustment mode, step S109 of the user adjustment mode, and step S111 of the standby adjustment mode. In this instance, control is executed to change the electrical angles of the drive signals in angle steps Δθ of the foregoing embodiment instead of the intervals of electrical stability points θs.

As an eighth modification, the display light image 6 may be virtually displayed in at least one of the zero detection mode, the initial adjustment mode, and the standby adjustment mode.

As a ninth modification, the drive signal control flow may be initiated in response to a command from the vehicle user 5 in addition to or instead of the turning on of the engine switch 7.

As a tenth modification, a "stopper mechanism" capable of holding the optical position Po of the reflecting mirror 32 at the zero position Poz may be employed in place of the stopper gear portion 530 provided for the speed reducer gear mechanism 50. For example, a "stopper mechanism" structured to directly latch the reflecting mirror 32 may be provided for the optical system 30.

As an eleventh modification, the projector 20 may be substituted, for example, by a laser scanner that uses a micro-electromechanical system to project laser light providing the display light image 6 or by a video display system that uses a digital mirror device to project visible light or laser light providing the display light image 6.

As a twelfth modification, the display light image 6 may be projected onto an item other than the windshield 4 of the vehicle unlike in the foregoing embodiment, such as a combiner specifically designed for use with the vehicle HUD device 1.

Although embodiments and configurations according to the present disclosure have been illustrated, the embodiments and configurations according to the present disclosure are not limited to those illustrated above. For example, embodiments and configurations obtained from appropriately combining technical elements disclosed in different embodiments and configurations are also included within the scope of the embodiments and configurations according to the present disclosure.

What is claimed is:

1. A vehicle head-up display device comprising:
a projector that projects a display light image;
an optical system that includes a rotatable reflecting mirror to reflect the display image light projected from the projector, and displays as a virtual image the display light image reflected from the reflecting mirror;
a stepping motor that outputs a rotation to adjust an optical position of the reflecting mirror;
a speed reducer gear mechanism that includes a plurality of gears to reduce a speed of the rotation, which is outputted from the stepping motor and transmitted to the reflecting mirror; and
a control system that controls the rotation of the stepping motor,
wherein the vehicle head-up display device sets a display range and a reset range as mutually-continuous ranges of adjusting the optical position, the display range is a range in which the virtual image is viewable to a vehicle user, and the reset range is a range in which the vehicle user is inhibited from viewing the virtual image,
the vehicle head-up display device further comprising
a stopper mechanism that holds the optical position at a zero position at an end of the reset range that is opposite the display range;
wherein the control system includes:

a zero detection unit that detects the zero position by causing the stepping motor to output the rotation in a return-to-zero direction;

an initial adjustment unit that, after the zero position is detected, adjusts the optical position to an initial position based on the zero position within the display range by causing the stepping motor to output the rotation in an away-from-zero direction, which is a direction opposite the return-to-zero direction; and a user adjustment unit that, after the adjustment of the initial position, adjusts the optical position to a command position based on the zero position within the display range by causing the stepping motor to output the rotation responsive to a command from the vehicle user, wherein the zero detection unit sets the rotation speed of the stepping motor to a higher value than the user adjustment unit, and the zero detection unit sets an output torque to a lower value than the user adjustment unit; and wherein the initial adjustment unit sets the rotation speed of the stepping motor to a higher value than the user adjustment unit.

2. The vehicle head-up display device according to claim 1, wherein the zero detection unit changes an electrical angle of a drive signal, which is to be applied to the stepping motor, by a value that corresponds to the whole adjustment range of the optical position.

3. The vehicle head-up display device according to claim 1, wherein the zero detection unit executes control to change the electrical angle of the drive signal, which is to be applied to the stepping motor, at angle steps smaller than intervals of electrical stability points in the stepping motor.

4. The vehicle head-up display device according to claim 1, wherein the zero detection unit and the initial adjustment unit execute control to change the electrical angle of the drive signal, which is to be applied to the stepping motor, at control intervals shorter than the user adjustment unit.

5. The vehicle head-up display device according to claim 1, wherein the zero detection unit performs pulse-width modulation of the drive signal, which is to be applied to the stepping motor, at an on-duty ratio smaller than the user adjustment unit.

6. The vehicle head-up display device according to claim 1, wherein:

the control system further includes a standby adjustment unit that adjusts the optical position to a standby position based on the zero position within the reset range by causing the stepping motor to output the rotation in the return-to-zero direction in response to the turning off of an engine switch of the vehicle; and the zero detection unit detects the zero position in response to the turning on of the engine switch.

* * * * *